US011207938B2

(12) United States Patent
Seo

(10) Patent No.: US 11,207,938 B2
(45) Date of Patent: Dec. 28, 2021

(54) APPARATUS AND METHOD FOR CONTROLLING LIFT AXLE OF VEHICLE

(71) Applicants: HYUNDAI MOTOR COMPANY, Seoul (KR); KIA MOTORS CORPORATION, Seoul (KR)

(72) Inventor: In Ho Seo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 323 days.

(21) Appl. No.: 16/393,303

(22) Filed: Apr. 24, 2019

(65) Prior Publication Data

US 2020/0156431 A1 May 21, 2020

(30) Foreign Application Priority Data

Nov. 19, 2018 (KR) .................. 10-2018-0142381

(51) Int. Cl.
*B60G 17/052* (2006.01)
*B62D 61/12* (2006.01)
*B60G 17/0195* (2006.01)
*B60G 11/27* (2006.01)

(52) U.S. Cl.
CPC .......... *B60G 17/0525* (2013.01); *B60G 11/27* (2013.01); *B60G 17/0195* (2013.01); *B62D 61/12* (2013.01); *B60G 2202/152* (2013.01); *B60G 2400/90* (2013.01); *B60G 2500/32* (2013.01); *B60G 2600/21* (2013.01); *B60G 2800/22* (2013.01)

(58) Field of Classification Search
CPC ...... B62D 61/00; B62D 61/12; B62D 61/125; B60G 17/0195; B60G 17/0525
See application file for complete search history.

(56) References Cited

U.S. PATENT DOCUMENTS

| | | | | |
|---|---|---|---|---|
| 5,016,544 | A * | 5/1991 | Woollam | B61D 15/02 105/215.2 |
| 5,378,020 | A * | 1/1995 | Horn | B62D 37/00 180/21 |
| 5,403,031 | A * | 4/1995 | Gottschalk | B60G 9/02 280/86.5 |
| 5,505,481 | A * | 4/1996 | VanDenberg | B60G 11/27 280/124.157 |
| 8,931,788 | B2 * | 1/2015 | Becke | B60G 17/0526 280/86.5 |
| 9,776,677 | B2 * | 10/2017 | Yakimishyn | B60G 17/0523 |
| 10,427,485 | B2 * | 10/2019 | Ackermann | B60W 20/13 |

(Continued)

FOREIGN PATENT DOCUMENTS

KR 10-1368061 B1 2/2014

*Primary Examiner* — Barry Gooden, Jr.
(74) *Attorney, Agent, or Firm* — McDonnell Boehnen Hulbert & Berghoff LLP

(57) ABSTRACT

The present disclosure relates to an apparatus and method for controlling a lift axle of a vehicle. To assist with braking according to an operation of a forward collision avoidance (FCA) system by using the lift axle in an emergency braking situation, the vehicle lift axle control apparatus includes a lift axle actuator that drives the lift axle of the vehicle, an interworking device that interworks with the FCA system, and a controller that controls the lift axle actuator based on information obtained from the FCA system.

16 Claims, 7 Drawing Sheets

(56) References Cited

U.S. PATENT DOCUMENTS

| | | | | |
|---|---|---|---|---|
| 10,450,016 | B2* | 10/2019 | Smith | B60G 17/0155 |
| 2006/0213701 | A1* | 9/2006 | Durif | B60P 1/16 |
| | | | | 180/24 |
| 2006/0249922 | A1* | 11/2006 | Hinz | B60G 9/04 |
| | | | | 280/124.116 |
| 2013/0048101 | A1* | 2/2013 | Becke | B60G 17/0526 |
| | | | | 137/334 |
| 2016/0159381 | A1* | 6/2016 | Fahmy | B61L 27/0088 |
| | | | | 701/19 |
| 2017/0225729 | A1* | 8/2017 | Yakimishyn | B60G 11/28 |
| 2017/0267043 | A1* | 9/2017 | Strong | B60G 17/005 |
| 2018/0037080 | A1* | 2/2018 | Ackermann | B60G 17/0195 |
| 2019/0176862 | A1* | 6/2019 | Kumar | G06K 9/00651 |

* cited by examiner

APPARATUS AND METHOD FOR CONTROLLING LIFT AXLE OF VEHICLE

CROSS REFERENCE TO RELATED APPLICATION

This application is claims the benefit of priority to Korean Patent Application No. 10-2018-0142381, filed in the Korean Intellectual Property Office on Nov. 19, 2018, the entire contents of which are incorporated herein by reference.

TECHNICAL FIELD

The present disclosure relates to a technology for controlling a lift axle of a vehicle.

BACKGROUND

Trucks carrying payloads exceeding a marginal capacity are a main source of destruction of roads, and also cause problems in the stability of the vehicles themselves. Accordingly, trucks that do not meet safety standards for allowable weight for each axle that drives wheels are subject to a clampdown.

To solve this problem, a vehicle is mounted with a lift axle to operate auxiliary wheels. The lift axle may be lowered (when the vehicle is loaded with a payload) or raised (when the vehicle is empty) as needed. The lift axle may be lowered to distribute the weight of the vehicle over the auxiliary wheels coupled to the lift axle, thereby reducing the magnitude of a load that a drive axle supports.

The lift axle is lowered or raised by a lift air spring and a load air spring. The lift air spring and the load air spring are operated by a pneumatic circuit, and the operation may be controlled directly by a driver or automatically.

The vehicle having the lift axle applied thereto may be advantageous in fuel efficiency, but may have relatively low braking performance when driven with the lift axle raised. Therefore, in a case where a forward collision avoidance (FCA) system performs emergency braking, the vehicle may fail to avoid a collision with a vehicle ahead due to an insufficient brake force when driven with the lift axle raised, compared with when driven with the lift axle lowered.

Consequently, the conventional lift axle control apparatus may be used to lower the lift axle to distribute the weight of the vehicle according to the driver's request when the weight of payloads exceeds a threshold value, but may fail to assist with braking according to an operation of the FCA system in an emergency braking situation and avoid a collision with a vehicle ahead.

SUMMARY

The present disclosure has been made to solve the above-mentioned problems occurring in the prior art while advantages achieved by the prior art are maintained intact.

An aspect of the present disclosure provides a vehicle lift axle control apparatus and method for assisting with braking according to an operation of a forward collision avoidance (FCA) system by using a lift axle in an emergency braking situation, thereby avoiding a collision with a vehicle ahead.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, an apparatus for controlling a lift axle of a vehicle includes a lift axle actuator that drives the lift axle of the vehicle, an interworking device that interworks with a forward collision avoidance (FCA) system, and a controller that controls the lift axle actuator, based on information obtained from the FCA system.

The controller, when obtaining time information for informing of a risk of collision of the vehicle, may control the lift axle actuator to lower the lift axle to a preparation position.

The controller, when obtaining time information for informing of braking of the vehicle, may control the lift axle actuator to lower the lift axle to a braking position.

The controller, when determining that a brake load of the vehicle is insufficient, may control the lift axle actuator to bring wheels of the lift axle into close contact with the ground to the maximum.

The apparatus may further include a road condition detector that detects a speed bump on a road. At this time, the controller may control the lift axle actuator when there is no speed bump on the road.

The lift axle actuator may include an air tank that stores compressed air, a first air bag that is inflated by the compressed air to raise the lift axle, a first valve that supplies the compressed air into the first air bag or blocks the supply of the compressed air into the first air bag, a first sensor that measures pressure inside the first air bag, a second air bag that is inflated by the compressed air to lower the lift axle, a second valve that supplies the compressed air into the second air bag or blocks the supply of the compressed air into the second air bag, and a second sensor that measures pressure inside the second air bag.

The controller may proportionally control the pressure inside the first air bag and the pressure inside the second air bag to adjust a position of the lift axle.

The first valve may additionally perform a function of discharging the air in the first air bag to the outside, and the second valve may additionally perform a function of discharging the air in the second air bag to the outside.

The first valve and the second valve may be solenoid valves.

According to another aspect of the present disclosure, a method for controlling a lift axle of a vehicle includes interworking with a forward collision avoidance (FCA) system by an interworking device, controlling a lift axle actuator by a controller, based on information obtained from the FCA system, and driving the lift axle of the vehicle by the lift axle actuator.

The controlling of the lift axle actuator may include controlling the lift axle actuator to lower the lift axle to a preparation position, when obtaining time information for informing of a risk of collision of the vehicle.

The controlling of the lift axle actuator may include controlling the lift axle actuator to lower the lift axle to a braking position, when obtaining time information for informing of braking of the vehicle.

The controlling of the lift axle actuator further may include controlling the lift axle actuator to bring wheels of the lift axle into close contact with the ground to the maximum, when determining that a brake load of the vehicle is insufficient.

The method may further include detecting a speed bump on a road by a road condition detector.

The controlling of the lift axle actuator may include controlling the lift axle actuator when there is no speed bump on the road.

The lift axle actuator may include an air tank that stores compressed air, a first air bag that is inflated by the compressed air to raise the lift axle, a first valve that supplies the compressed air into the first air bag or blocks the supply of the compressed air into the first air bag, a first sensor that measures pressure inside the first air bag, a second air bag that is inflated by the compressed air to lower the lift axle, a second valve that supplies the compressed air into the second air bag or blocks the supply of the compressed air into the second air bag, and a second sensor that measures pressure inside the second air bag.

The controlling of the lift axle actuator may include proportionally controlling the pressure inside the first air bag and the pressure inside the second air bag to adjust a position of the lift axle.

The first valve may additionally perform a function of discharging the air in the first air bag to the outside, and the second valve may additionally perform a function of discharging the air in the second air bag to the outside.

The first valve and the second valve may be solenoid valves.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
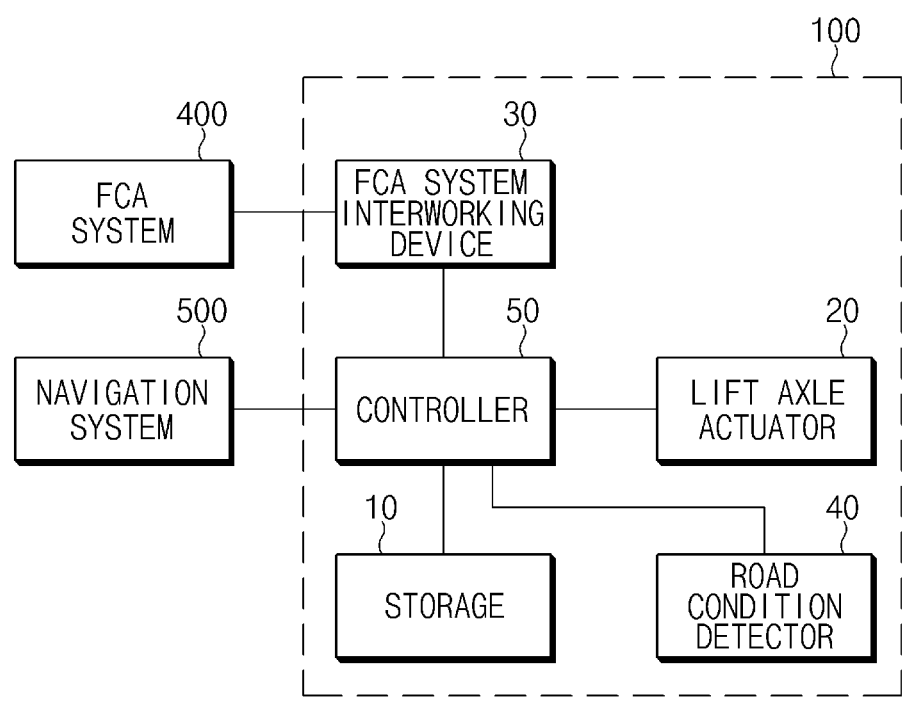
FIG. 1 is a view illustrating a configuration of an apparatus for controlling a lift axle of a vehicle according to an embodiment of the present disclosure.

Hereinafter, exemplary embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of an apparatus for controlling a lift axle of a vehicle according to an embodiment of the present disclosure.

As illustrated in FIG. 1, the vehicle lift axle control apparatus 100 according to the embodiment of the present disclosure may include storage 10, a lift axle actuator 20, a forward collision avoidance (FCA) system interworking device 30, a road condition detector 40, and a controller 50. The components may be integrated according to manners of carrying out the vehicle lift axle control apparatus 100 according to the embodiment of the present disclosure. In addition, some of the components may be omitted according to manners of carrying out the disclosure.

The storage 10 may store various kinds of logic, algorithms, and programs required to assist with braking according to an operation of an FCA system 400 by using a lift axle 320 in an emergency braking situation.

The storage 10 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The lift axle actuator 20 raises or lowers the lift axle 320 under the control of the controller 50.

Hereinafter, a configuration and a structure of the lift axle actuator 20 will be described with reference to FIGS. 2 and 3.

Figure 2:
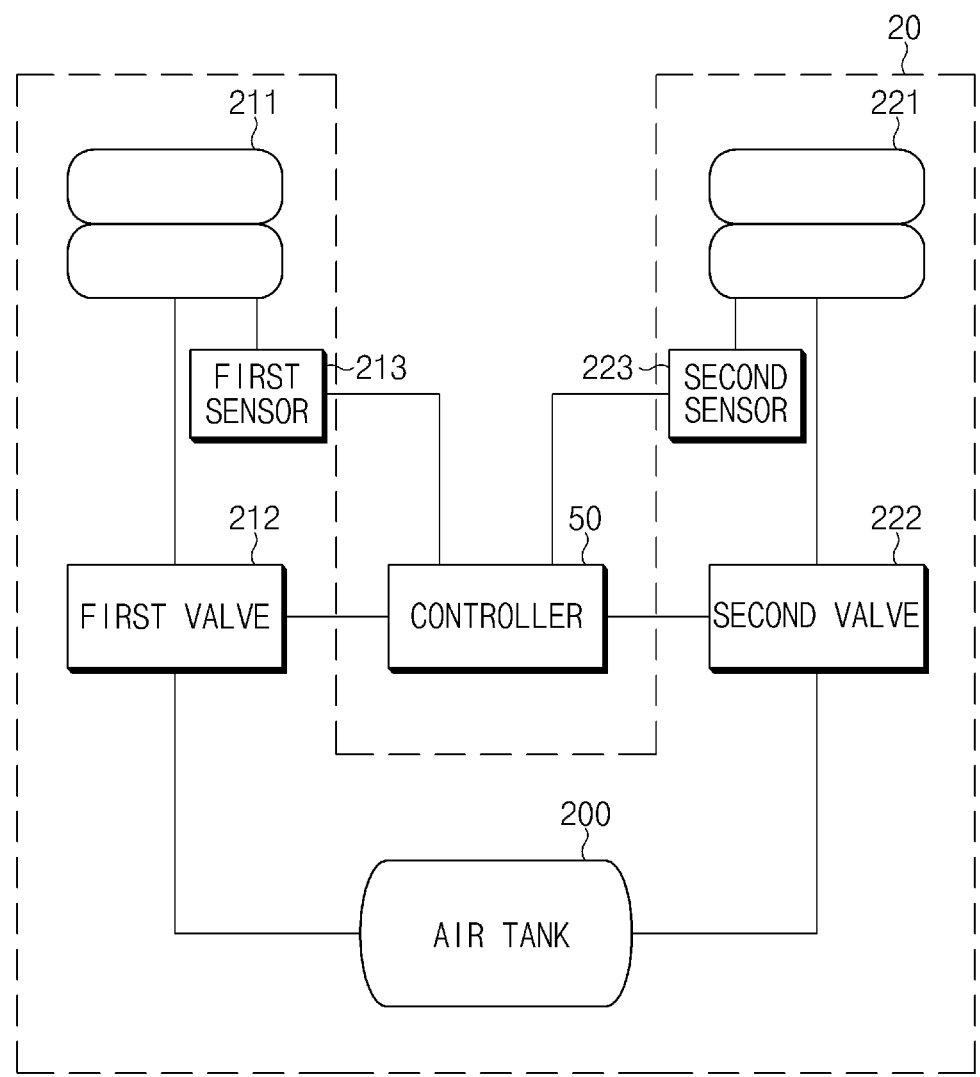
FIG. 2 is a view illustrating a configuration of a lift axle actuator according to an embodiment of the present disclosure.

FIG. 2 is a view illustrating a configuration of the lift axle actuator according to an embodiment of the present disclosure.

As illustrated in FIG. 2, the lift axle actuator 20 according to the embodiment of the present disclosure may include an air tank 200, a first air bag 211, a first valve 212, a first sensor 213, a second air bag 221, a second valve 222, and a second sensor 223. Here, the first air bag 211, the first valve 212, and the first sensor 213 are referred to as a lifting actuator, and the second air bag 221, the second valve 222, and the second sensor 223 are referred to as a lowering actuator.

The air tank 200 stores compressed air and is basically mounted in a commercial vehicle. The air tank 200 may maintain a reference pressure by an air compressor (not illustrated) that is mounted in the commercial vehicle.

The first air bag 211 is a module that raises the lift axle 320. When air is supplied from the air tank 200, the first air bag 211 inflates to raise the lift axle 320. Wheels coupled to the lift axle 320 are lifted off the ground when the lift axle 320 is raised.

The first valve 212 is a module that supplies air from the air tank 200 into the first air bag 211 or blocks the supply of air into the first air bag 211. The first valve 212 may be implemented with, for example, a solenoid valve. The first valve 212 may discharge air in the first air bag 211 to the outside under the control of the controller 50.

The first sensor 213 measures the pressure inside the first air bag 211 and transmits the measured pressure to the controller 50.

The second air bag 221 is a module that lowers the lift axle 320. The second air bag 221 inflates to lower the lift axle 320 when air is supplied from the air tank 200. The wheels coupled to the lift axle 320 contact the ground when the lift axle 320 is lowered. For reference, when air in the first air bag 211 is discharged to the outside, the lift axle 320 is lowered by the force of gravity. At this time, the second air bag 221 may finely control the lowered position of the lift axle 320, or may cause the wheels coupled to the lift axle 320 to tightly contact the ground.

The second valve 222 is a module that supplies air from the air tank 200 into the second air bag 221 or blocks the supply of air into the second air bag 221. The second valve 222 may be implemented with, for example, a solenoid valve. The second valve 222 may discharge air in the second air bag 221 to the outside under the control of the controller 50.

The second sensor 223 measures the pressure inside the second air bag 221 and transmits the measured pressure to the controller 50.

The controller 50 may move the lift axle 320 to a preparation position, a braking position, and a maximum braking position by adjusting (proportionally controlling) the pressure inside the first air bag 211 and the pressure inside the second air bag 221 together using the first valve 212 and the second valve 222.

Figure 3:
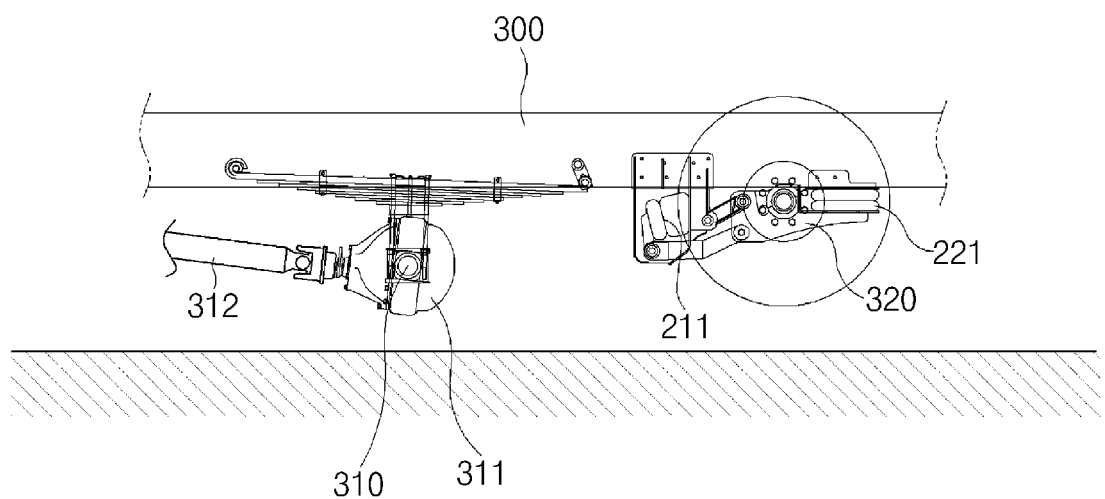
FIG. 3 is a view illustrating a structure of the lift axle actuator according to the embodiment of the present disclosure.

FIG. 3 is a view illustrating a structure of the lift axle actuator according to the embodiment of the present disclosure.

In FIG. 3, reference numeral 300 denotes a vehicle axle, reference numeral 310 denotes a drive axle, reference numeral 311 denotes a drive axle housing, reference numeral 312 denotes an axle, and reference numeral 320 denotes the lift axle. For reference, structures, positions, and operations of the first air bag 211 and the second air bag 221 are well-known and common technologies, and therefore detailed descriptions thereabout will be omitted.

The FCA system interworking device 30 is a module that provides a connection interface with the FCA system 400. The FCA system interworking device 30 may obtain, from the FCA system 400, information about time to inform a driver of a risk of collision of the vehicle, information about time to apply partial braking to the vehicle, and information about time to apply full braking to the vehicle.

Furthermore, the FCA system interworking device 30 may additionally obtain the distance from a vehicle ahead and estimated time of collision from the FCA system 400.

Hereinafter, the FCA system 400 will be described with reference to FIG. 4.

Figure 4:
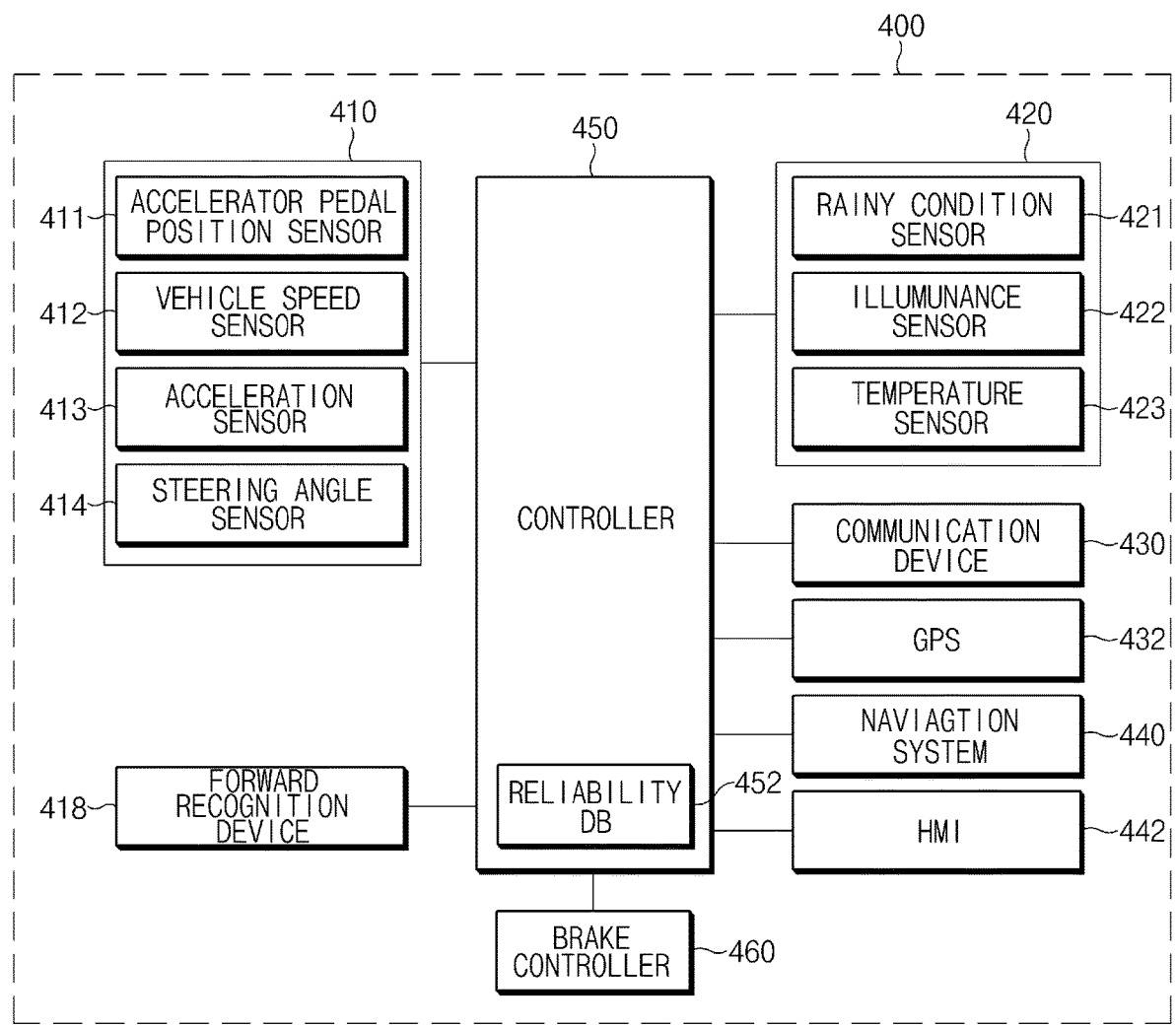
FIG. 4 is a view illustrating an example of an FCA system used in the present disclosure.

FIG. 4 is a view illustrating an example of the FCA system used in the present disclosure.

As illustrated in FIG. 4, the FCA system 400 used in this disclosure may include a vehicle data detection module 410, a forward recognition device 418, an environmental data detection module 420, a communication device 430, a navigation system 440, and a controller 450.

The vehicle data detection module 410 detects vehicle data for vehicle collision avoidance control, and the data measured by the vehicle data detection module 410 is transmitted to the controller 450. The vehicle data detection module 410 includes an accelerator pedal position sensor 411, a vehicle speed sensor 412, an acceleration sensor 413, and a steering angle sensor 414.

The accelerator pedal position sensor 411 measures the degree to which the driver depresses an accelerator pedal. That is, the accelerator pedal position sensor 411 measures data regarding the driver's will to accelerate the vehicle.

The vehicle speed sensor 412 may measure the speed of the vehicle.

The acceleration sensor 413 detects the acceleration of the vehicle. The acceleration of the vehicle may be directly detected by the acceleration sensor 413 installed separately from the vehicle speed sensor 412, or may be calculated by differentiating a vehicle speed detected by the vehicle speed sensor 412.

The steering angle sensor 414 detects the steering angle of the vehicle. That is, the steering angle sensor 414 detects a direction in which the vehicle is to travel.

The forward recognition device 418 detects the distance between the driver's vehicle and a vehicle ahead. Various sensors such as a camera, a radar, and the like may be used as the forward recognition device 418. For example, in a case where a vehicle is ahead of the driver's vehicle, the radar measures the distance from the vehicle ahead using ultrasonic waves or a laser and outputs an electrical signal to the controller 450.

The environmental data detection module 420 detects environmental data around the vehicle for vehicle collision avoidance control, and the data measured by the environmental data detection module 420 is transmitted to the controller 450. The environmental data detection module 420 includes a rainy condition sensor 421, an illuminance sensor 422, and a temperature sensor 423.

The rainy condition sensor 421 operates wipers in the event of rainfall during travel of the vehicle. At this time, the rainy condition sensor 421 checks operating states (OFF/INT/LO/HI) of the wipers and outputs electrical signals corresponding to the respective operating states to the controller 450. Alternatively, the rainy condition sensor 421 may measure rainfall using a rain sensor and may output an electrical signal to the controller 450 according to the rainfall.

That is, the rainy condition sensor 421 senses a rainy condition around the vehicle. An output signal from the rainy condition sensor 421 is transmitted to the controller 450. The controller 450 may vary time to initiate a control intervention for a pre-brake, a brake assist, and an active brake to secure a braking distance according to the rainy condition.

For example, in a case where a level of rainfall is classified into low, intermediate, and high, the controller 450 initiates a control intervention for warning and pre-fill early when the level of rainfall is high.

The illuminance sensor 422 may sense the degree of brightness around the vehicle. An output signal from the illuminance sensor 422 may be transmitted to the controller 450. The controller 450 may vary time to initiate a control intervention for primary warning, secondary warning, and pre-fill to secure the driver's view and maintain a safe distance according to the degree of brightness.

For example, in the case of night driving, the controller 450 may initiate a control intervention for warning early.

The rainy condition sensor 421 and the illuminance sensor 422 are used for the purpose of more accurately determining surroundings of the vehicle while the vehicle is being driven.

The temperature sensor 423 may sense the temperature around the vehicle.

The communication device 430 may include one or more modules that enable wireless communication between the vehicle and a wireless communication network or between the vehicle and a network in which the vehicle is located.

The communication device 430 may receive, from an external server, temperature, a time range, and weather information of an area where the vehicle is located. At this time, the communication device 430 may receive the position of the vehicle from a GPS module 432.

The GPS module 432 receives radio waves from a GPS satellite and transmits signals for the received radio waves to the communication device 430 and the navigation system 440.

The navigation system 440 is a device that informs the driver of a path to a destination. The navigation system 440 may include an input/output device for inputting/outputting information about route guide, a memory for storing map data required to calculate a route and data required for guide, and a controller for executing route search or route guide.

The controller 450 determines control conditions of functions of the vehicle collision avoidance system and controls warning and braking.

The controller 450 may determine a driving state using vehicle data and environmental data. The controller 450 may read reliability of the forward recognition device 418 that corresponds to the determined driving state, from a reliability database 452. The controller 450 may modify at least one of control intervention time and an amount of braking according to the read reliability.

Furthermore, the controller 450 may transmit a signal to a human machine interface (HMI) 442 to output an alarm to the driver and may communicate with a brake controller 460 to control braking of the vehicle.

The brake controller 460 may include an anti-lock braking system (ABS), a traction control system (TCS), an electric control suspension (ESP), or an electronic stability control (ESC).

The road condition detector 40 may detect a speed pump, a puddle, or an obstacle on a road by using a LiDAR sensor. The road condition detector 40 may detect a speed pump, a puddle, or an obstacle on a road by using a stereo camera.

The controller 50 performs overall control to enable the components to perform functions thereof normally. The controller 50 may be implemented in a hardware or software form, or may be implemented in a form in which hardware and software are combined together. The controller 50 may preferably be implemented with, but is not limited to, a microprocessor.

The controller 50 may perform overall control required in a process of assisting with braking according to an operation of the FCA system 400 by using the lift axle 320 in an emergency braking situation.

The controller 50 may control the lift axle actuator 20 to raise or lower the lift axle 320.

The controller 50 may control the FCA system interworking device 30 to obtain, from the FCA system 400, information about time to inform the driver of a risk of collision of the vehicle (hereinafter, referred to as first time information), information about time to apply partial braking to the vehicle, and information about time to apply full braking to the vehicle (hereinafter, referred to as second time information).

The controller 50 may obtain road information from a navigation system 500 mounted in the vehicle. The road information may include the type of road, the position of a speed bump on the road, the position of damage on the road, an obstacle on the road, and the like.

When obtaining time information for informing of a risk of collision of the vehicle through the FCA system interworking device 30, the controller 50 controls the lift axle actuator 20 to lower the lift axle 320 to a preparation position (e.g., a position where the wheels coupled to the lift axle 320 are raised off the ground by a distance of 5 cm). The aim is to allow the lift axle 320 to be immediately used for braking in a case where the second time information is obtained.

Here, the controller 50 may determine whether to control the lift axle actuator 20, based on the road information obtained through the navigation system 500. That is, in a case where there is no speed bump or obstacle on the road, the controller 50 preferably controls the lift axle actuator 20 to lower the lift axle 320 to the preparation position.

When obtaining time information for informing of braking of the vehicle through the FCA system interworking device 30, the controller 50 controls the lift axle actuator 20 to lower the lift axle 320 to a braking position (e.g., a position where the wheels coupled to the lift axle 320 contact the ground to support part of the weight of the vehicle). At this time, the time information for informing of the braking of the vehicle may be information about time to apply partial braking to the vehicle or information about time to apply full braking to the vehicle. However, it is preferable that the time information for informing of the braking of the vehicle be information about time to apply full braking to the vehicle. Here, because the wheels coupled to the lift axle 320 are also under the control of the FCA system 400, the wheels coupled to the lift axle 320 also brake to a halt at the time when the FCA system 400 controls braking of the vehicle.

When determining that a brake load is insufficient, the controller 50 may control the lift axle actuator 20 to bring the wheels coupled to the lift axle 320 into close contact with the ground to the maximum. That is, the controller 50 may control the lift axle actuator 20 to lower the lift axle 320 to a maximum braking position. At this time, the lift axle actuator 20 inflates the second air bag 221 to the maximum to bring the wheels coupled to the lift axle 320 into close contact with the ground to the maximum. Here, the controller 50 may further include a sensor (not illustrated) that senses the weight of the vehicle.

Hereinafter, an operation of the controller 50 will be described in detail with reference to FIG. 5.

Figure 5:
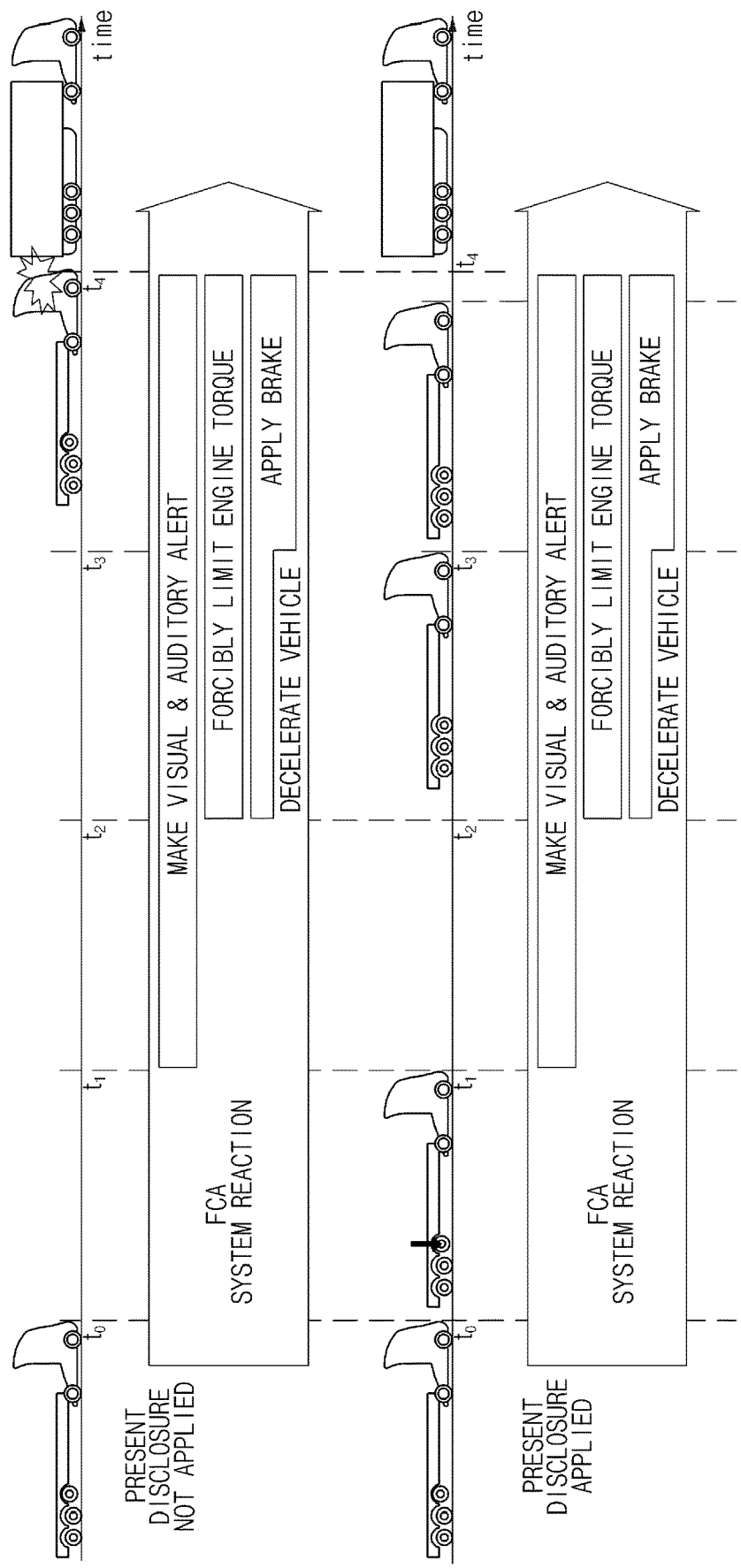
FIG. 5 is a view illustrating the performance of the vehicle lift axle control apparatus according to the embodiment of the present disclosure.

FIG. 5 is a view illustrating the performance of the vehicle lift axle control apparatus according to the embodiment of the present disclosure.

In FIG. 5, $t_0$ denotes the time that the driver's vehicle monitored the road condition, $t_1$ denotes the time (the warning time) that the driver was warned about a collision with the forward vehicle, $t_2$ denotes the time (the partial braking time) that the brake of the driver's vehicle was partially applied, $t_3$ denotes the time (the full braking time) that the brake of the driver's vehicle was fully applied, and $t_4$ denotes the time that the driver's vehicle collided with the forward vehicle.

It can be seen that, in the case where the present disclosure was not applied, the wheels coupled to the lift axle 320 were lifted and the driver's vehicle crashed with the forward vehicle due to the deficiency in brake force.

However, it can be seen that, in the case where the present disclosure was applied, the controller 50 controlled the lift axle actuator 20 at time $t_1$ to lower the lift axle 320 to the preparation position and controlled the lift axle actuator 20 at time $t_3$ to lower the lift axle 320 to the braking position so that the wheels coupled to the lift axle 320 generated a braking force to prevent a collision with the forward vehicle.

Figure 6:
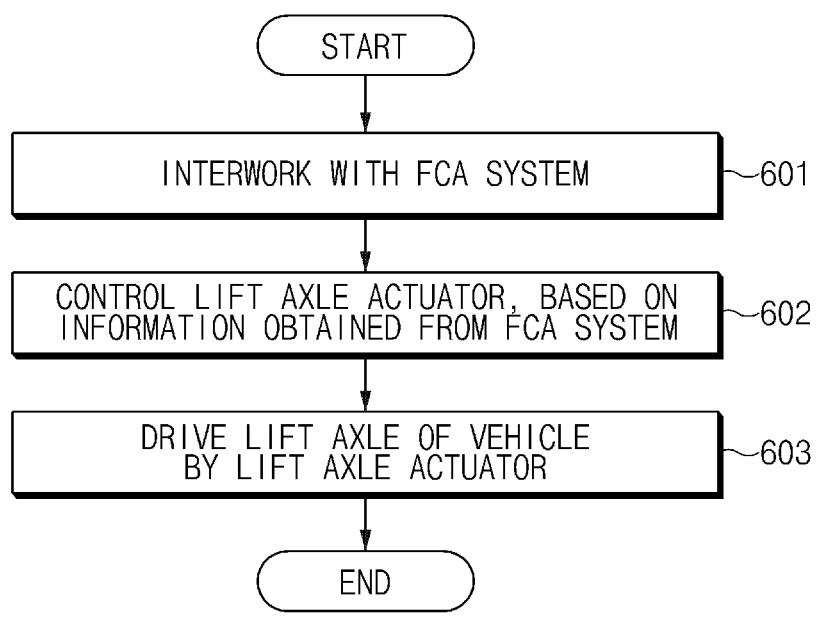
FIG. 6 is a flowchart illustrating a vehicle lift axle control method according to an embodiment of the present disclosure.

FIG. 6 is a flowchart illustrating a vehicle lift axle control method according to an embodiment of the present disclosure.

First, the FCA system interworking device 30 interworks with the FCA system 400 (Step 601).

Next, the controller 50 controls the lift axle actuator 20, based on information obtained from the FCA system 400 (Step 602).

Thereafter, the lift axle actuator 20 drives the lift axle 320 of the vehicle (Step 603).

Figure 7:
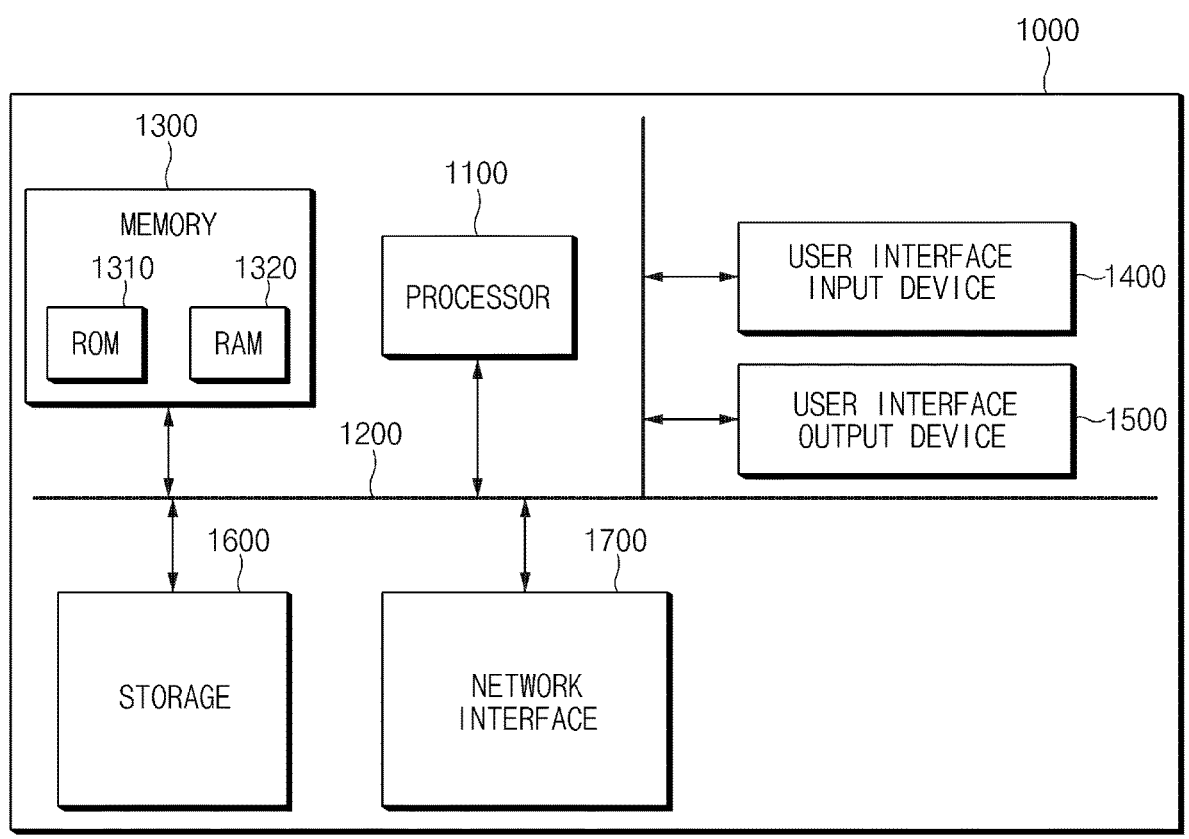
FIG. 7 is a block diagram illustrating a computing system for executing the vehicle lift axle control method according to the embodiment of the present disclosure.

FIG. 7 is a block diagram illustrating a computing system for executing the vehicle lift axle control method according to the embodiment of the present disclosure.

Referring to FIG. 7, the above-described vehicle lift axle control method according to the embodiment of the present disclosure may also be implemented through a computing system 1000. The computing system 1000 may include at least one processor 1100, a memory 1300, a user interface input device 1400, a user interface output device 1500, storage 1600, and a network interface 1700 that are coupled together through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described in relation to the embodiments disclosed herein may be directly implemented with a hardware module or a software module executed by the processor 1100, or a combination thereof. The software module may reside in a storage medium (that is, the memory 1300 and/or the storage 1600) such as a RAM memory, a flash memory, a ROM memory, an EPROM memory, an EEPROM memory, a register, a hard disk, a solid state drive (SSD), a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the embodiments of the present disclosure, the vehicle lift axle control apparatus and method may assist with braking according to an operation of the FCA system by using the lift axle in an emergency braking situation, thereby avoiding a collision with a vehicle ahead.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for controlling a lift axle of a vehicle, the apparatus comprising:
   a lift axle actuator configured to drive the lift axle of the vehicle;
   an interworking device configured to interwork with a forward collision avoidance (FCA) system; and
   a controller configured to control the lift axle actuator, based on information obtained from the FCA system, when obtaining time information for informing of a risk of collision of the vehicle, controls the lift axle actuator to lower the lift axle to a preparation position;
   wherein the controller, when obtaining time information for informing of braking of the vehicle, controls the lift axle actuator to lower the lift axle to a braking position.

2. The apparatus of claim 1, wherein the controller, when determining that a brake load of the vehicle is insufficient, controls the lift axle actuator to bring wheels of the lift axle into close contact with the ground to a maximum.

3. The apparatus of claim 1, further comprising:
   a road condition detector configured to detect a speed bump on a road.

4. The apparatus of claim 3, wherein the controller controls the lift axle actuator when there is no speed bump on the road.

5. The apparatus of claim 1, wherein the lift axle actuator includes:
   an air tank configured to store compressed air;
   a first air bag configured to be inflated by the compressed air to raise the lift axle;
   a first valve configured to supply the compressed air into the first air bag or block the supply of the compressed air into the first air bag;
   a first sensor configured to measure pressure inside the first air bag;
   a second air bag configured to be inflated by the compressed air to lower the lift axle;
   a second valve configured to supply the compressed air into the second air bag or block the supply of the compressed air into the second air bag; and
   a second sensor configured to measure pressure inside the second air bag.

6. The apparatus of claim 5, wherein the controller proportionally controls the pressure inside the first air bag and the pressure inside the second air bag to adjust a position of the lift axle.

7. The apparatus of claim 5, wherein the first valve additionally performs a function of discharging the air in the first air bag to an outside, and the second valve additionally performs a function of discharging the air in the second air bag to the outside.

8. The apparatus of claim 5, wherein the first valve and the second valve are solenoid valves.

9. A method for controlling a lift axle of a vehicle, the method comprising:
   interworking with a forward collision avoidance (FCA) system by an interworking device;
   controlling a lift axle actuator by a controller, based on information obtained from the FCA system; and
   driving the lift axle of the vehicle by the lift axle actuator;
   wherein the controlling of the lift axle actuator includes:

controlling the lift axle actuator to lower the lift axle to a preparation position, when obtaining time information for informing of a risk of collision of the vehicle; and controlling the lift axle actuator to lower the lift axle to a braking position, when obtaining time information for informing of braking of the vehicle.

10. The method of claim 9, wherein the controlling of the lift axle actuator further includes:

controlling the lift axle actuator to bring wheels of the lift axle into close contact with the ground to a maximum, when determining that a brake load of the vehicle is insufficient.

11. The method of claim 9, further comprising:

detecting when a speed bump is on a road by a road condition detector.

12. The method of claim 11, wherein the controlling of the lift axle actuator includes:

controlling the lift axle actuator when there is no speed bump on the road.

13. The method of claim 9, wherein the lift axle actuator includes:

an air tank configured to store compressed air;

a first air bag configured to be inflated by the compressed air to raise the lift axle;

a first valve configured to supply the compressed air into the first air bag or block the supply of the compressed air into the first air bag;

a first sensor configured to measure pressure inside the first air bag;

a second air bag configured to be inflated by the compressed air to lower the lift axle;

a second valve configured to supply the compressed air into the second air bag or block the supply of the compressed air into the second air bag; and a second sensor configured to measure pressure inside the second air bag.

14. The method of claim 13, wherein the controlling of the lift axle actuator includes:

proportionally controlling the pressure inside the first air bag and the pressure inside the second air bag to adjust a position of the lift axle.

15. The method of claim 13, wherein the first valve additionally performs a function of discharging the air in the first air bag to an outside, and the second valve additionally performs a function of discharging the air in the second air bag to the outside.

16. The method of claim 13, wherein the first valve and the second valve are solenoid valves.

* * * * *